Oct. 11, 1960    H. W. BONNETT ET AL    2,955,662
MEANS FOR CHORDWISE AND SPANWISE BALANCING OF ROTOR BLADES
Filed Nov. 10, 1955    3 Sheets-Sheet 1

Inventors
HORACE W. BONNETT
FREDERICK W. MENOLD

By M. B. Tasker
Attorney

Oct. 11, 1960  H. W. BONNETT ET AL  2,955,662
MEANS FOR CHORDWISE AND SPANWISE BALANCING OF ROTOR BLADES
Filed Nov. 10, 1955  3 Sheets-Sheet 2

Inventors
HORACE W. BONNETT
FREDERICK W. MENOLD

M. B. Tasker

Attorney

INVENTORS
HORACE W. BONNETT
FREDERICK W. MENOLD
BY
AGENT

United States Patent Office 2,955,662
Patented Oct. 11, 1960

2,955,662

MEANS FOR CHORDWISE AND SPANWISE BALANCING OF ROTOR BLADES

Horace W. Bonnett, Fairfield, and Frederick W. Menold, Milford, Conn., assignors to United Aircraft Corporation, East Hartford, Conn., a corporation of Delaware Filed Nov. 10, 1955, Ser. No. 546,072

14 Claims. (Cl. 170—159)

This invention relates to rotor blades for rotary wing aircraft and particularly to improved means for balancing such blades. This application is a continuation-in-part of application Serial No. 271,522, now abandoned.

It has been known to provide means for balancing rotor blades chordwise, for example, as shown in the Doman Patent No. 2,451,541, in which a weight is mounted in a chordwise disposed tube in which it is adjustable to alter the chordwise balance of the blade. Due to the extreme length of present day rotor blades and their flexibility, a device such as shown in the Doman patent for balancing the blade at only one spanwise station becomes unsatisfactory, resulting in severe twisting of the blade and consequent variation in pitch of the blade at various points along its length.

It is an object of the present invention to provide means for adjusting the chordwise balance of a rotor blade which is effective substantially throughout its length.

A further object of the invention is to provide blade balancing means including weight means which extend spanwise throughout a substantial portion of the blade span thereby distributing the weight of said weight means throughout a substantial spanwise length of said blade.

A further object of the invention is to provide a spanwise arranged blade balancing weight member which is adjustable chordwise of the blade and spanwise spaced supports therefor which are adjustable spanwise of the blade.

These and other objects and advantages of the invention will be apparent or will be pointed out in connection with the several embodiments illustrated in the accompanying drawings.

Figure 1:
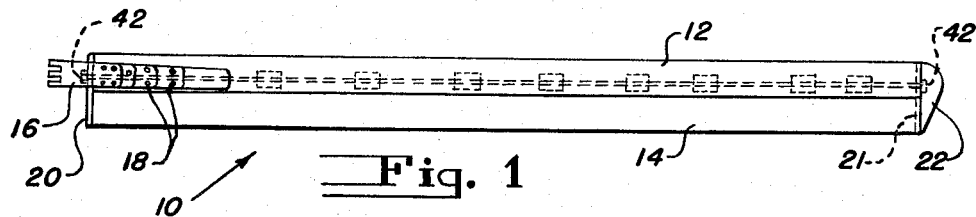
Fig. 1 is a plan view of a rotor blade for rotary wing aircraft embodying one form of the invention.
Figure 2:
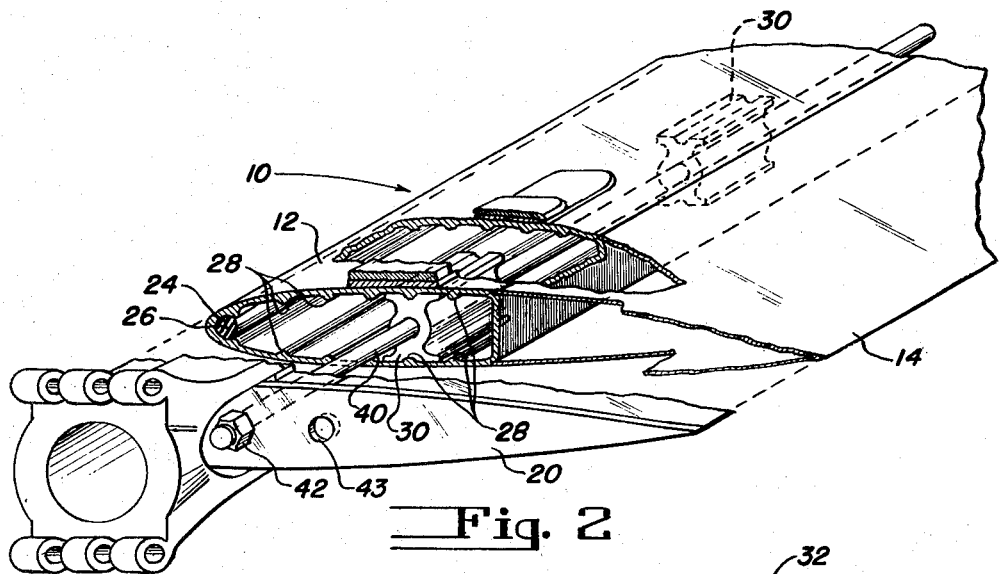
Fig. 2 is an enlarged perspective view of the blade of Fig. 1 with parts broken away.

As shown in Figs. 1 and 2, the blade generally indicated at 10 is of all-metal construction and consists of an extruded spar member 12 which extends throughout the length of the blade and constitutes the main strength element thereof. The spar member is formed of airfoil cross section and conforms throughout its chordwise extent to the airfoil contour of the blade, the remainder of the airfoil contour being completed by a lighter sheet metal trailing edge portion 14 which is secured to said spar member 12.

The blade is secured to the rotor hub by means of a root attachment member 16 which is secured to the spar member 12 by adhesives and/or bolts 18. The hollow interior of the blade is closed at its root end by a plate member 20 and at its tip end by a similar plate 21, tip member 22 completing the blade in the more or less usual manner. This general type of rotor blade is shown in the Sikorsky Patent No. 2,469,480, issued May 10, 1949, and reference is made to this patent for a further detailed disclosure of this type of blade.

Figure 3:
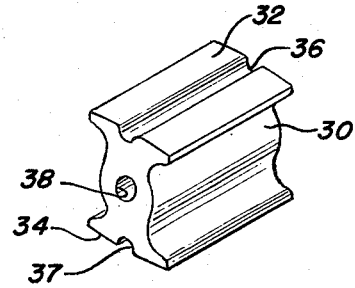
Fig. 3 is a detailed perspective view of one element of the blade balancing mechanism shown in Fig. 2.

The spar member 12 is extruded with an internal leading edge groove 24 in which is placed a rod 26 of high density material. Application Serial No. 186,021, filed September 21, 1950, now Pat. No. 2,754,918, shows a specific construction of a leading edge weight such as discussed here. This rod may be continuous from root to tip of the blade or it may be comprised of a plurality of short sections in order that they may be a completely nonstructural part of the blade, serving only as blade balancing elements. The spar member 12 also has extruded on its upper and lower inner surfaces opposing pairs of spanwise ribs 28 which serve to strengthen the spar but which are provided essentially for the purpose of locating a series of spacer blocks 30 (Fig. 3) which are adapted to be forced into the spar cavity and lie at spanwise spaced points along the spar as shown in Fig. 2. Each of the blocks 30 has upper and lower surfaces 32 and 34 which are slightly arcuate and conform to the inner arcuate surfaces of the extrusion, grooves 36 and 37 being provided in surfaces 32 and 34 which are adapted to receive any one of a pair of upper and lower ribs 28. This enables a series of the blocks 30 to be pressed into the spar cavity in a plurality of positions chordwise of the blade as will be evident from Fig. 2.

The spacer blocks 30 have an axial passage 38, through which a spanwise disposed balancing rod 40 is inserted. This rod which may be, for example, a steel rod of 3/16" diameter, extends through aligned apertures in the root end plate 20 and the tip end plate 21 and is firmly secured in place by nuts 42 received on its opposite threaded ends. Additional passages, one of which is shown at 43 in Fig. 2, are provided in the closure plates 20 and 21 to receive the rod 40 when the row of blocks 30 is placed on any other pair of ribs 28 of the spar than that illustrated in Fig. 2.

It will be evident that by providing a suitable number of blocks 30 and by locating the assembly including these blocks and the rod 40 on different pairs of ribs 28, the chordwise center of gravity of the blade throughout its entire length can be varied, without altering the spanwise balance, since the blocks and the rod 40 which is inserted in the holes 38 in the blocks will occupy varying positions chordwise of the blade. With this arrangement, since the rod 40 extends throughout the spanwise length of the blade, the chordwise center of gravity of the blade will be identical at any chordwise section thereof taken along the spar. The spanwise balance of the blade can be altered by varying the spacing of the blocks in the spar and the total weight of the blade can be brought up to the weight of a master blade by varying the number of blocks. Thus the chordwise location of the entire assembly of spacer blocks and rod will change the chordwise location of the center of gravity and the variable number and spanwise location of the blocks will change the location of the center of gravity of the blade spanwise and vary the blade weight as is necessary to produce interchangeable blades.

Figures 4, 5:
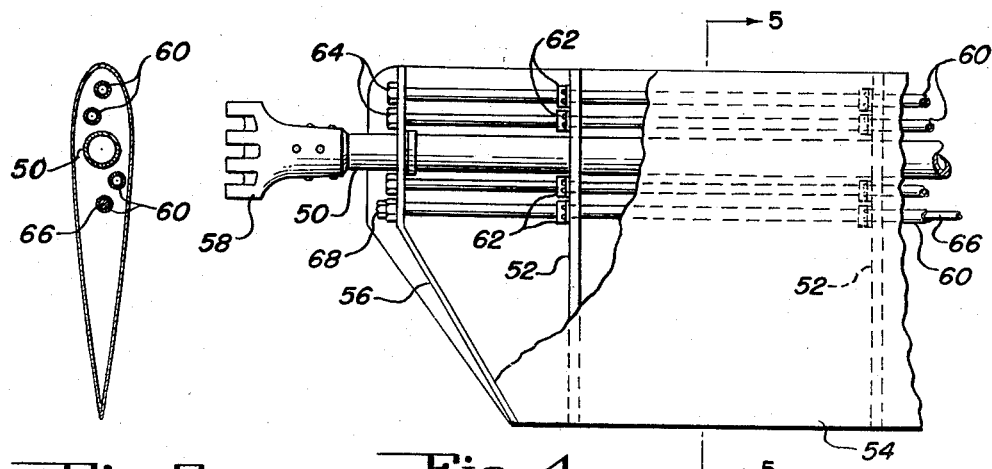
Fig. 4 is a plan view of a modified form of blade balancing mechanism, parts being broken away to facilitate illustration.
Fig. 5 is a section on line 5—5 of Fig. 4.

In Figs. 4 and 5 a modified form of the invention has been illustrated which is adapted for use in fabric covered blades. As shown in Fig. 4, the blade includes the usual tubular metal spar 50, chordwise ribs 52 and fabric cover 54. The blade is also provided with a root end closure plate 56 and root attachment fitting 58. It will be understood that a closure plate (not shown) similar to plate 56 is also provided at the outboard end of the spar. A plurality if spanwise guide tubes 60, preferably aluminum, are provided herein located fore and aft of the spar 50 and parallel therewith. These tubes are supported in bushings 62 in the blade ribs, to which bushings the tubes 60 are attached, and in the end closure plates and are held in position by nuts 64 which are threaded onto opposite protruding ends of the tubes. It will be noted that the tubes 60 are slightly staggered with reference to the chordwise plane of the blade as indicated in Fig. 5 but that in all cases they are parallel with the spar and coextensive therewith. Although the tubes are shown staggered they may also be aligned in one plane where the internal blade structure permits. A steel balancing rod 66, herein shown as inserted in the most aft tube 60, is adapted to be inserted in any one of the tubes 60 and to be secured in place by nuts 68 on the opposite ends of the rod, one of which is shown in Fig. 4. It will be clear that with this construction the chordwise balance of the blade can be altered by inserting rod 66 into a different tube while the spanwise balance of the blade will remain unchanged. The bushings 62 distribute the centrifugal forces since these bushings are attached to the tubes.

Figure 6:
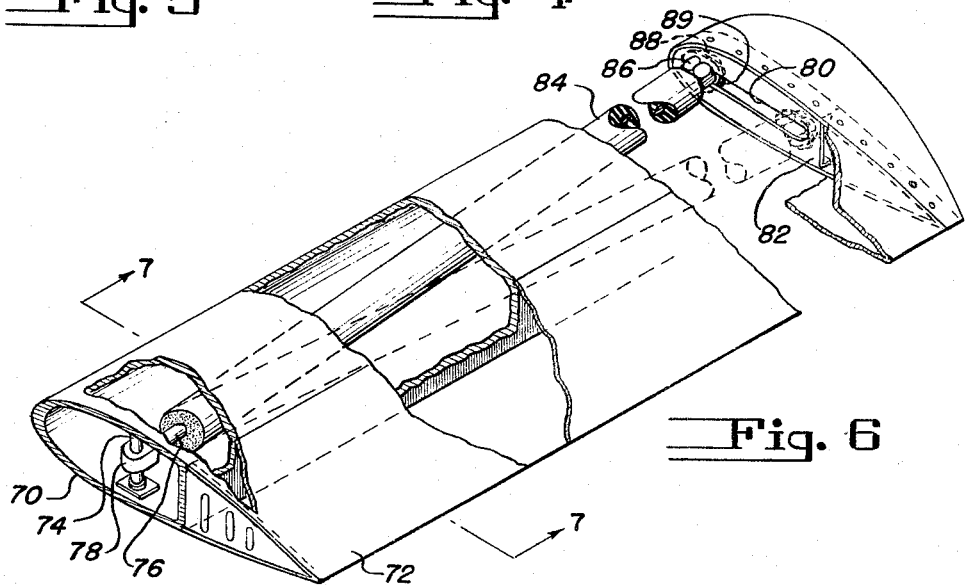
Fig. 6 is a perspective view of still another form of the invention, the blade being shown partly in section and with parts broken away to better illustrate the blade balancing mechanism.
Figure 7:
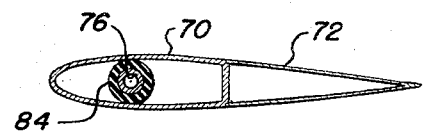
Fig. 7 is a section on line 7—7 of Fig. 6.

In Figs. 6 and 7 a still further modification is illustrated. In this construction the spar 70 is an extruded member similar to that of the Fig. 1 form and the blade is completed by one or more aft sheet metal pockets 72. At some point in the spar 70, preferably just outboard of the root end closure plates, a pivot pin 74 is provided which is suitably supported at its opposite ends in the upper and lower walls of the spar. This pin forms a pivotal support for a spanwise extended rod or tube 76, preferably of aluminum or steel, which is provided with an enlarged eye 78 through which the pin 74 extends. Rod 76 at its outboard end extends through a chordwise slot 80 in the outboard end closure plate 82, and this outboard end of rod 76 is threaded to receive a nut 86 which lies inboard of the closure plate 82 and supports a sponge rubber or like protective covering 84 which may be bonded to rod 76 against outward movement due to centrifugal force and acts to support the weight between the upper and lower surfaces of the spar. A similar nut 88 is threaded on rod 76 on the opposite side of end closure plate 82 and serves as a clamping nut to secure the hollow rod 76 and its covering 84 in any selected position of chordwise adjustment within the limits of the slot 80. Nut 88 is also adapted to secure balance shims or washers 89 which would provide a means of spanwise balance for the blade. This spanwise weight could also be secured at the tip in a known manner as shown in Fig. 6 of United States Patent No. 2,620,884 to M. E. Gluhareff issued December 9, 1952. Since the tubular weight 84 extends throughout substantially the entire span of the blade, movement of its outboard end in slot 80 will vary the chordwise balance of the blade without affecting its spanwise balance.

Figure 8:
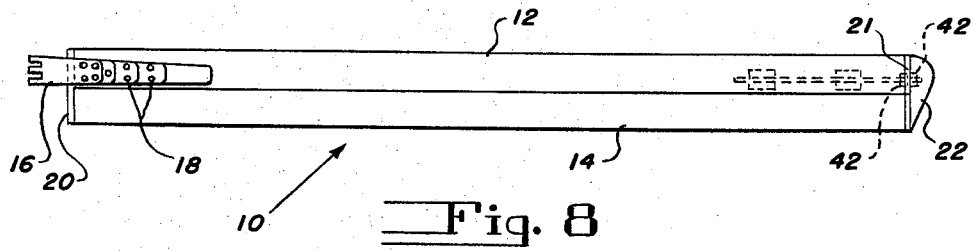
Fig. 8 is a plan view of a rotor blade for rotary wing aircraft embodying the form of the invention shown in Figs. 1 and 2 with the weight means extending for only a portion of the blade span.
Figure 9:
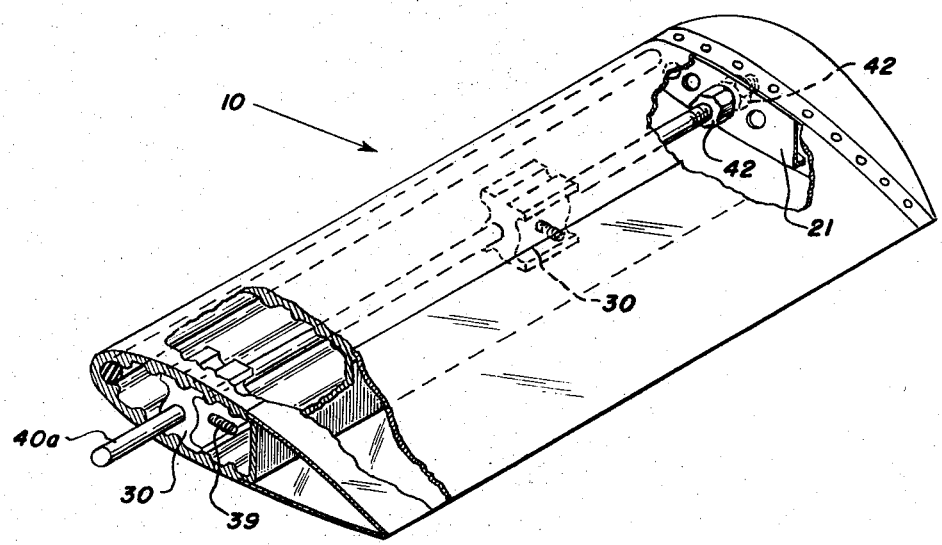
Fig. 9 is an enlarged perspective view of the blade of Fig. 8 with parts broken away showing the weight means extending for a portion of the blade span.

Figs. 8 and 9 show a construction similar to Figs. 1 and 2 with the spanwise disposed balancing rod 40a extending for approximately 20 percent of the blade span. This rod 40a may be held in position by nuts 42 threaded to the outboard end of rod 40a, one located on either side of end plate 21 or by any means desired. Any means, such as set screws 39, can be used to hold the blocks 30 in place. Further, any desired number of blocks 30 can be used, the only limitation being the length of the rod 40a. While the Figs. 7 and 8 show variations of Figs. 1 and 2, it is to be understood that the weight means of the other two modifications shown can be likewise varied. It is to be understood that blocks such as 30 can be constructed with a multiplicity of axial passages 38 if desired.

While the rod 40a is shown at an outboard section of approximately 20 percent of the blade span, this rod can extend for any section of the blade which provides a substantial length for a distributed weight. For example, a rod could be mounted between the 50 percent point of the blade and the 80 percent point. This rod may be fixed by any means desired. For example, one block 30 could be secured in the spar and the set screw 39 therein used to hold the rod or the axial passage of the block could be threaded to receive a threaded section of the rod.

From the above description of the invention it will be clear that means has been provided which enables a rotor blade to be balanced both chordwise and spanwise and particularly that means has been provided for adjusting the travel of the chordwise center of gravity of the blade without affecting the spanwise balance thereof. It is also made possible by this invention to adjust both the spanwise and the chordwise balance of a rotor blade to agree with a master blade and thereby greatly facilitate the mass production of interchangeable rotor blades.

While three modifications of the invention have been shown herein, illustrating the principles of the invention, it will be evident that other variations may be made in the construction and arrangement of the balancing elements without departing from the scope of the invention.

We claim:
1. In a rotor blade for rotary wing aircraft, the combination of a hollow elongated spar constituting the main strength member of the blade, first weight means extending parallel with the longitudinal axis of said spar, said weight means being fixed against chordwise movement in the forward part of said blade, means located within the cavity of said spar for balancing the blade chordwise including second weight means enclosed by said spar and extending spanwise therethrough for a distance which includes a substantial length of the blade, and means for positioning said second weight means in a plurality of positions chordwise of the blade.

2. In a rotor blade for rotary wing aircraft, the combination of a hollow spar constituting the main strength element of the blade, and means for varying the balance of the blade at a plurality of its chordwise sections throughout at least a substantial portion of the blade span including weight supporting means within said spar extending generally spanwise of the blade, said weight supporting means including a plurality of spanwise located elements adapted to be located within said hollow spar in spaced relation and spaced substantially from the leading edge of said hollow hollow spar, weight means carried by said elements and extending throughout said portion of the blade span, and means for securing said weight means in said elements in a plurality of positions chordwise of the blade.

3. In a rotor blade for rotary wing aircraft, the combination of a hollow spar constituting the main strength element of the blade, and means for varying the balance of the blade at a plurality of its chordwise sections including weight supporting means within said spar extending generally spanwise of the blade, said weight supporting means including a plurality of spanwise located elements adapted to be located within said hollow spar in spaced relation and spaced substantially from the leading edge of said hollow spar, weight means carried by said elements and extending therethrough for a distance which includes a substantial length of the blade, and means for securing said weight means in said elements in a plurality of positions chordwise of the blade.

4. In a rotor blade for rotary wing aircraft, the combination of a spar constituting the main strength member of the blade, and means for simultaneously varying the balance of the blade at all of its chordwise sections throughout the blade span including a rod-like weight member generally parallel with said spar and which extends along the length of said blade, and supporting means for said rod-like weight member, said supporting means including elements spaced spanwise in said hollow spar and spaced substantially from the leading edge of said hollow spar and having spanwise passage means therethrough in which said rod-like weight member can be inserted.

5. In a rotor blade for rotary wing aircraft, the combination of a hollow spar forming the leading portion of the blade and conforming to the airfoil contour of the blade throughout the chordwise extent of said spar, a rod-like weight member located in said spar and extending spanwise thereof throughout substantially the entire length of said spar, supporting means for said weight member carried by said spar, said supporting means including elements spaced spanwise in said hollow spar and spaced substantially from the leading edge of said hollow spar, said elements having axial passage means in which said weight member is received, said supporting means and said spar having cooperating means for positioning said weight member in a plurality of chordwise positions in said spar.

6. A rotor blade including the combination of claim 5 in which the cooperating means on said supporting means and on said spar comprise cooperating grooves and ribs extending in a spanwise direction.

7. A rotor blade including the combination of claim 5 in which the spaced elements for the rod-like weight member comprises a plurality of spacer blocks disposed in spanwise spaced relation in the spar.

8. A rotor blade including the combination of claim 5 in which the hollow spar has a plurality of pairs of upper and lower ribs on its internal walls extending spanwise thereof at various chordwise locations, and the weight supporting means comprises a plurality of spacer blocks having grooves on their upper and lower surfaces adapted to receive different pairs of ribs to position said weight member in a plurality of chordwise positions in said spar.

9. In a rotor blade for rotary wing aircraft, the combination of a spar constituting the main strength member of the blade, and a combined spanwise and chordwise balancing assembly for said blade including a plurality of spanwise located balancing elements adapted to be located along said spar in suitably spaced relation to provide the desired spanwise balance of the blade, said elements having spanwise aligned passages therethrough, and an elongated chordwise balancing member extended through the passages in a plurality of said elements for providing the desired chordwise balance of said blade.

10. In a rotor blade for rotary wing aircraft, the combination of a hollow spar constituting the main strength member of the blade, and a combined spanwise and chordwise balancing assembly for said blade including a plurality of balancing elements adapted to be inserted into said spar in a spanwise row and in suitably spaced relation with each other to provide the desired spanwise balance of the blade, said elements having spanwise aligned passages, and an elongated balancing member extended through the passages in a plurality of said elements for providing chordwise balance of said blade, and means on the inner surface of said hollow spar for positioning said assembly in a plurality of chordwise positions of adjustment.

11. In a blade for rotary wing aircraft, the combination of a hollow spar of uniform cross section throughout a major portion of the blade, forming the leading edge and constituting the main strength member of the blade, a first weight means located in the forward portion of said spar extending throughout a major spanwise portion of said spar, said first weight being fixed against chordwise movement, and second weight means located within said spar and extending spanwise throughout a substantial portion of said spar for adjusting the balance of said blade, said second weight means being movable to a plurality of positions chordwise in said spar, and means supporting said second weight means chordwise in said spar.

12. In a blade for rotary wing aircraft, the combination of a hollow spar of uniform cross section throughout a major portion of the blade, forming the leading edge and constituting the main strength member of the blade, a first weight means located in the forward portion of said spar extending throughout a major spanwise portion of said spar, said first weight being fixed against chordwise movement, and second weight means located within said spar and extending spanwise throughout a substantial portion of said spar for adjusting the balance of said blade, said second weight means being movable to a plurality of positions chordwise in said spar, said second weight means comprising a rod-like member, and means supporting said second weight means chordwise in said spar, said supporting means and said spar having cooperating means for positioning said supporting means spanwise of said spar.

13. In a rotor blade for rotary wing aircraft, the combination of a hollow spar forming the leading portion of the blade and conforming to the airfoil contour of the blade substantially throughout the chordwise extent of said spar, the upper and lower inner walls of said spar comprising a plurality of spanwise extending guides, said guides being spaced chordwise of said spar, rod-like weight means extending spanwise of said spar for a substantial portion of the span of the blade, said weight means being movable to any of several positions of adjustment chordwise of the blade, and means for supporting said spanwise extending rod-like weight means in its selected chordwise position, said supporting means having guides, guides of said supporting means and said spar cooperating to position said supporting means spanwise of said spar.

14. In a rotor blade for rotary wing aircraft, the combination of a hollow spar constituting the main strength element of the blade, and means for varying the balance of the blade at a plurality of its chordwise sections throughout at least a substantial portion of the blade span including weight supporting means within said spar extending generally spanwise of the blade, said weight supporting means including a plurality of spanwise located elements adapted to be located within said hollow spar in spaced relation and spaced from the leading edge of said hollow spar, and weight means carried by said elements and extending throughout said portion of the blade span.

References Cited in the file of this patent

UNITED STATES PATENTS

| | | |
|---|---|---|
| 2,451,541 | Doman | Oct. 19, 1948 |
| 2,460,351 | Hoffman et al. | Feb. 1, 1949 |
| 2,620,884 | Gluhareff | Dec. 9, 1952 |
| 2,638,170 | Prewitt | May 12, 1953 |
| 2,644,537 | Meyers | July 7, 1953 |
| 2,754,917 | Kee | July 17, 1956 |
| 2,754,918 | Gluhareff | July 17, 1956 |

FOREIGN PATENTS

| | | |
|---|---|---|
| 57,227 | Netherlands | Apr. 15, 1946 |
| 1,009,798 | France | June 3, 1952 |